US008342604B2

(12) United States Patent
Heisey et al.

(10) Patent No.: US 8,342,604 B2
(45) Date of Patent: Jan. 1, 2013

(54) JUVENILE VEHICLE SEAT WITH SEAT-BACK CHANNEL COVER

(75) Inventors: Nathan W. Heisey, Columbus, IN (US); Curtis J. Brandl, Fishers, IN (US)

(73) Assignee: Cosco Management, Inc., Wilmington, DE (US)

( * ) Notice: Subject to any disclaimer, the term of this patent is extended or adjusted under 35 U.S.C. 154(b) by 213 days.

(21) Appl. No.: 12/698,807

(22) Filed: Feb. 2, 2010

(65) Prior Publication Data

US 2010/0253120 A1 Oct. 7, 2010

Related U.S. Application Data (60) Provisional application No. 61/149,908, filed on Feb. 4, 2009.

(51) Int. Cl.
A47C 1/08 (2006.01)
(52) U.S. Cl. .................... 297/256.1; 297/484; 297/250.1
(58) Field of Classification Search ............... 297/250.1, 297/256.1, 484, 273
See application file for complete search history.

(56) References Cited

U.S. PATENT DOCUMENTS

| | | | | |
|---|---|---|---|---|
| 3,896,512 A * | 7/1975 | Black | | 5/17 |
| 5,024,484 A * | 6/1991 | Buchacz | | 297/300.3 |
| 5,641,200 A * | 6/1997 | Howell | | 297/256.17 |
| 5,806,924 A * | 9/1998 | Gonas | | 297/216.11 |
| 6,030,047 A | 2/2000 | Kain | | |
| 6,135,553 A * | 10/2000 | Lovie et al. | | 297/250.1 |
| 6,491,348 B1 | 12/2002 | Kain | | |
| 6,626,493 B2 * | 9/2003 | Kain | | 297/250.1 |
| 6,688,685 B2 | 2/2004 | Kain | | |
| 6,779,843 B2 | 8/2004 | Kain | | |
| 6,908,151 B2 | 6/2005 | Meeker et al. | | |
| 6,945,605 B2 * | 9/2005 | Kinoshita et al. | | 297/317 |
| 6,991,291 B2 * | 1/2006 | Knoblock et al. | | 297/284.4 |
| 7,021,710 B2 * | 4/2006 | Kain et al. | | 297/256.11 |
| 7,171,706 B2 * | 2/2007 | Piretti | | 5/18.1 |
| 7,261,376 B2 * | 8/2007 | Kespohl | | 297/256.13 |
| 7,275,792 B2 * | 10/2007 | Pos | | 297/396 |
| 7,370,912 B2 * | 5/2008 | Williams et al. | | 297/256.11 |
| 2001/0011838 A1 * | 8/2001 | Kassai et al. | | 297/250.1 |
| 2002/0145318 A1 * | 10/2002 | Asbach et al. | | 297/250.1 |
| 2007/0040428 A1 * | 2/2007 | Sakumoto | | 297/250.1 |
| 2007/0057544 A1 * | 3/2007 | Nakhla et al. | | 297/250.1 |
| 2007/0188002 A1 * | 8/2007 | Jane Santamaria | | 297/256.1 |
| 2008/0136232 A1 * | 6/2008 | Hutchinson et al. | | 297/250.1 |
| 2011/0074193 A1 * | 3/2011 | Hutchinson et al. | | 297/256.1 |
| 2011/0285187 A1 * | 11/2011 | Horton et al. | | 297/250.1 |

FOREIGN PATENT DOCUMENTS

| DE | 3614457 A1 * | 11/1987 |
|---|---|---|
| DE | 4137596 A1 * | 5/1993 |
| WO | WO 8201171 A1 * | 4/1982 |

* cited by examiner

*Primary Examiner* — David Dunn
*Assistant Examiner* — David E Allred
(74) *Attorney, Agent, or Firm* — Barnes & Thornburg LLP

(57) ABSTRACT

A child restraint includes a juvenile vehicle seat and a movable headrest mounted on the seat. The seat includes a base, a back, and a child-restraint harness coupled to the base and to the movable headrest. The child-restraint harness includes shoulder belts arranged to pass through openings formed in the seat back and the movable headrest.

18 Claims, 6 Drawing Sheets

JUVENILE VEHICLE SEAT WITH SEAT-BACK CHANNEL COVER

This application claims priority under 35 U.S.C. §119(e) to U.S. Provisional Application Ser. No. 61/149,908, filed Feb. 4, 2009, which is expressly incorporated by reference herein.

BACKGROUND

The present disclosure relates to seats for use by children in vehicles, and in particular, to juvenile vehicle seats including a headrest mounted for movement on a seat back. More particularly, the present disclosure relates to a juvenile vehicle seat including a restraint harness for securing a child sitting in the juvenile vehicle seat.

SUMMARY

According to the present disclosure, a child restraint includes a juvenile vehicle seat and a headrest mounted on the juvenile vehicle seat for up-and-down movement. The juvenile vehicle seat includes a seat shell having a seat base and a seat back arranged to extend upwardly away from the seat base and a child-restraint harness arranged to cooperate with the seat shell to restrain a child sitting on the seat shell.

In illustrative embodiments, the child-restraint harness includes first and second shoulder belts and each of the shoulder belts is arranged to pass through a companion one of first and second belt-travel channels formed in the seat back. The belt-travel channels are arranged to allow the shoulder belts to move along the length of the seat back as the headrest moves between a raised position and a lowered position relative to the seat base.

In illustrative embodiments, the headrest includes a head cradle and a channel cover coupled to the head cradle and arranged to cover the belt-travel channels regardless of the position of the headrest. The channel cover includes a movable pliable plate and lost-motion means for mounting the movable pliable plate on the head cradle for movement together as a unit toward the lowered position of the headrest until the movable pliable plate runs into the crotch belt and stops moving relative to the seat base while allowing the head cradle to continue to move toward the seat base until the headrest achieves the lowered position.

In illustrative embodiment, the lost-motion means includes a tab-receiving slot formed in the movable pliable plate and a connector tab appended to the head cradle and arranged to extend into the tab-receiving slot. The tab-receiving slot is located between an upper stop and a lower stop formed in the movable pliable plate and the connector tab is arranged to lie in mating contact with the upper stop when the headrest is in the raised position. During movement of the headrest to the lowered position, the connector tab remains in mating contact with the upper stop until the pliable plate contacts the crotch belt. After contact with the crotch belt, the movable pliable plate assumes a stopped position relative to the seat base and the connector tab moves downwardly in the tab-receiving slot and into mating contact with the lower stop when the headrest achieves the lowered position.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a front perspective view of a child restraint in accordance with the present disclosure showing a juvenile vehicle seat including a child-restraint harness and a seat shell having a seat back formed to include a pair of belt-travel channels, a headrest that is mounted for up-and-down movement on the seat back and is configured to include a head cradle having two side wings and a channel cover coupled to the head cradle to move therewith and showing that the child-restraint harness includes a first shoulder belt passing through a first shoulder belt-receiving slot formed in the head cradle and a first of the belt-travel channels formed in the seat back and a second shoulder belt passing through a second shoulder belt-receiving slot formed in the head cradle and a second of the of the belt-travel channels formed in the seat back, and that the channel cover is coupled to move up and down with the head cradle relative to the seat back during movement of the headrest between a raised position (FIG. 1) and a lowered position (FIG. 3) so that the belt-travel channels always remain covered regardless of the vertical position of the headrest on the seat back;

FIGS. 4-9 show a series of views illustrating downward movement of the headrest to assume the lowered position shown in FIG. 3 and showing that the headrest further includes lost-motion means for mounting the movable pliable plate on the head cradle so that the headrest is free to move downwardly to assume the lowered position even after the movable pliable plate stops moving after it runs into an obstruction (e.g. a crotch belt) included in the juvenile vehicle seat;

DETAILED DESCRIPTION

Figures 2A, 2B:
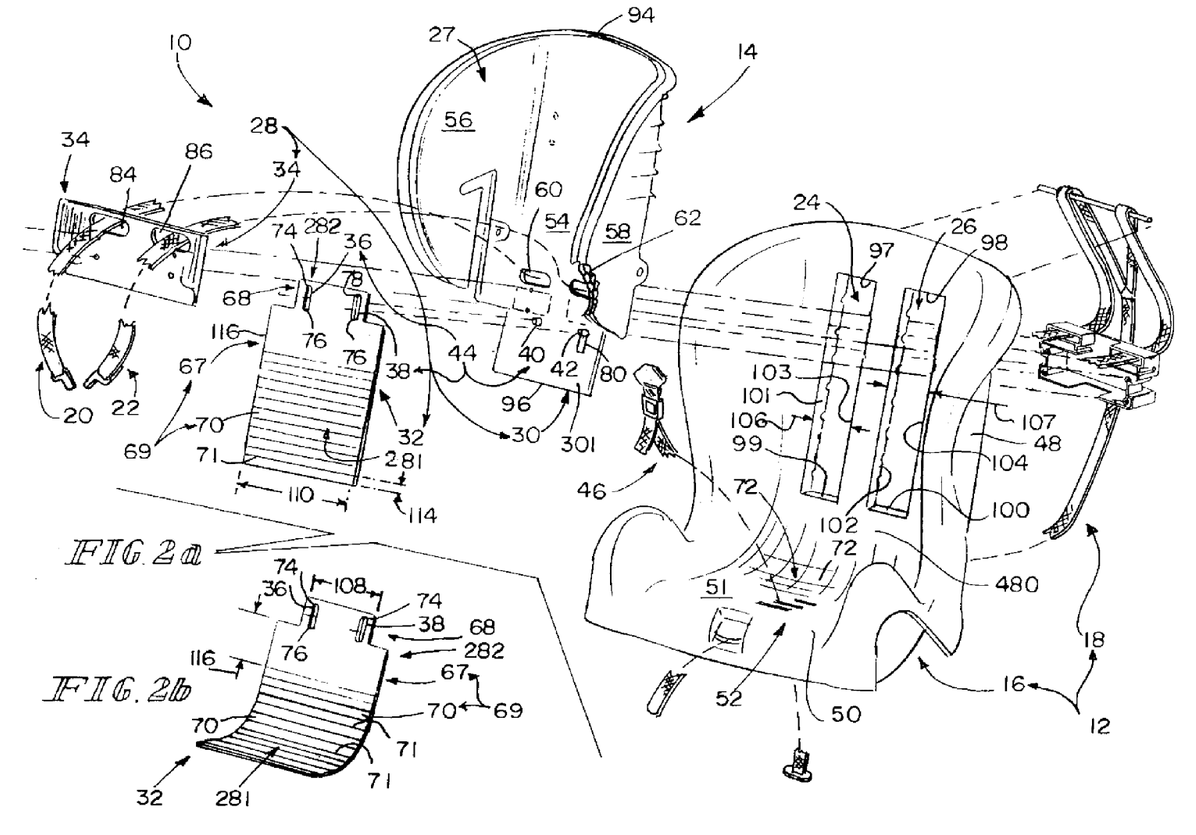
FIG. 2a is an exploded perspective assembly view of the child restraint of FIG. 1 showing that the pair of vertical belt-travel channels formed in the seat shell are sized to receive a pair of shoulder belts included in a child-restraint harness, a headrest configured to move up and down on the seat back, and the channel cover configured to cover the lower portions of each of the belt-travel channels while the headrest is in the raised position as suggested in FIG. 1 and showing that the channel cover includes a washboard-like movable pliable plate and a plate retainer formed to include first and second shoulder-belt receiver slots.
FIG. 2b is a perspective view of the pliable plate of FIG. 2a showing that the movable pliable plate is configured to bend to assume the contoured shape of the neighboring seat shell when the headrest has been moved to assume the lowered position as suggested in FIG. 3.
Figure 3:
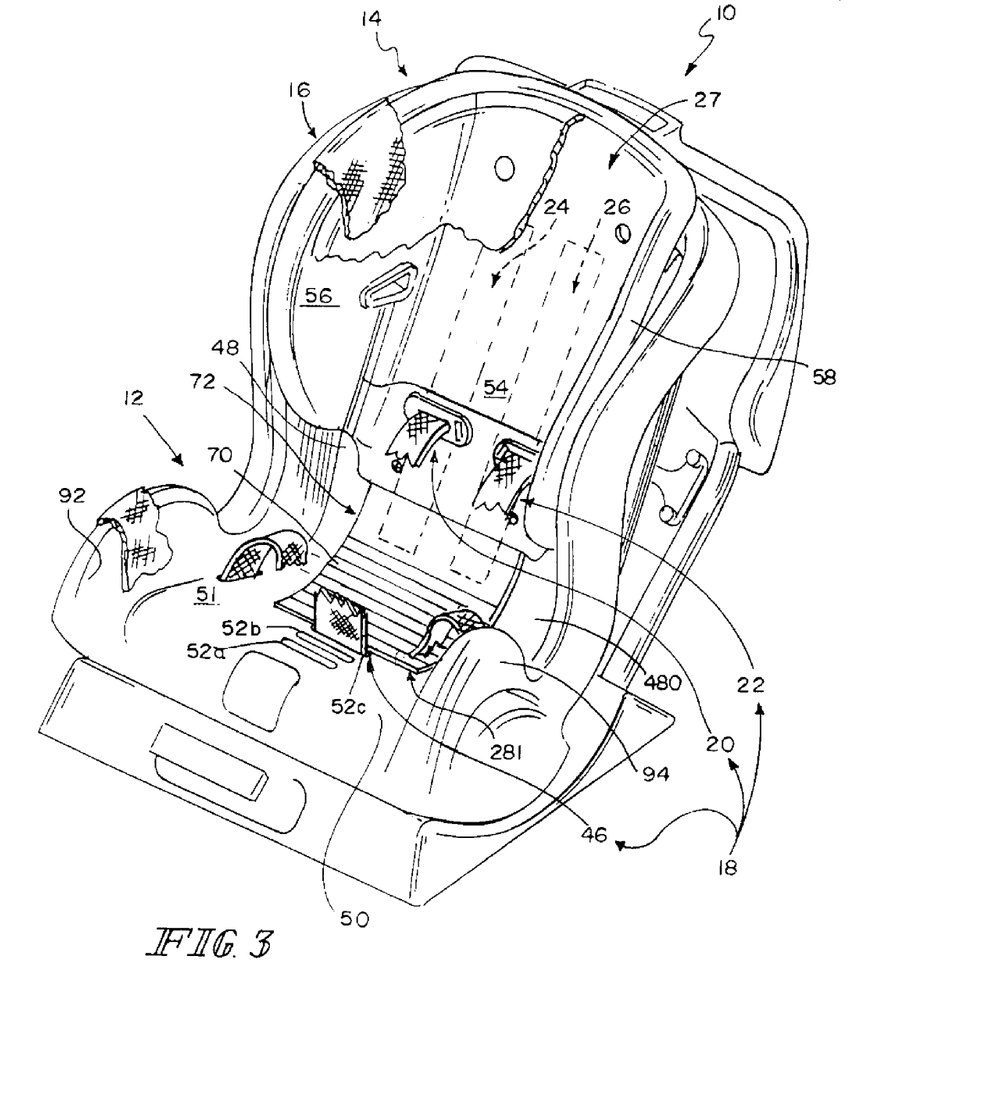
FIG. 3 is a perspective view similar to FIG. 1 showing that the channel cover continues to cover the lower portions of each of the belt-travel channels after the headrest has been moved to the lowered position and showing that the substantially movable pliable plate included in the channel cover has deformed to conform to the contoured shape of the seat shell while still maintaining coverage of the belt-travel channels.

A child restraint 10 in accordance with the present disclosure includes a juvenile vehicle seat 12 and a headrest 14 mounted on vehicle seat 12 for up-and-down movement between a raised position (FIG. 1) and a lowered position (FIG. 3). Juvenile vehicle seat 12 includes a seat shell 16 having a seat base 50 and a seat back 48 arranged to extend upwardly away from seat base 50 and a child-restraint harness 18 including first and second shoulder belts 20, 22 and a crotch belt 46. As shown in FIG. 2a, seat back 48 is formed to include a pair of laterally spaced-apart belt-travel channels 24, 26 and each shoulder belt 20, 22 is arranged to extend through a companion one of belt-travel channel 24, 26 as suggested in FIG. 1.

Headrest 14, as shown in FIG. 2a, includes a head cradle 27 and a channel cover 28. Channel cover 28 is coupled to head cradle 27 to move therewith and is arranged to cover exposed portions of belt-travel channels 24, 26 exposed as headrest 14 moves between the raised and lowered positions as shown in FIGS. 4-9.

Channel cover 28 includes a movable pliable plate 32 and lost-motion means 44 (see FIGS. 2a and 4) for mounting movable pliable plate 32 on head cradle 27 for movement together as a unit toward the lowered position of headrest 18 until movable pliable plate 32 runs into an obstruction, illustratively crotch belt 46, and stops moving relative to seat base 50 until headrest 14 achieves the lowered position as shown in FIGS. 6-9. Pliable plate 32 is configured to bend and conform substantially to the contoured shape of seat shell 16 as suggested in FIGS. 2b and 3.

Illustratively, lost-motion means 44 includes an upper stop 74 and a lower stop 76 both formed in movable pliable plate 32 as shown in FIGS. 2a and 2b. Upper stop 74 is positioned to lie in spaced-apart relation to lower stop 76 to cause a tab-receiving slot 36 to be formed in movable pliable plate 32 therebetween. Lost-motion means 44 further includes a first connector tab 40 appended to head cradle 27 and arranged to extend into tab-receiving slot 36 to move away from upper stop 74 toward lower stop 76 during movement of headrest 14 toward seat base 50 as illustrated in FIGS. 6-9.

Figure 1:
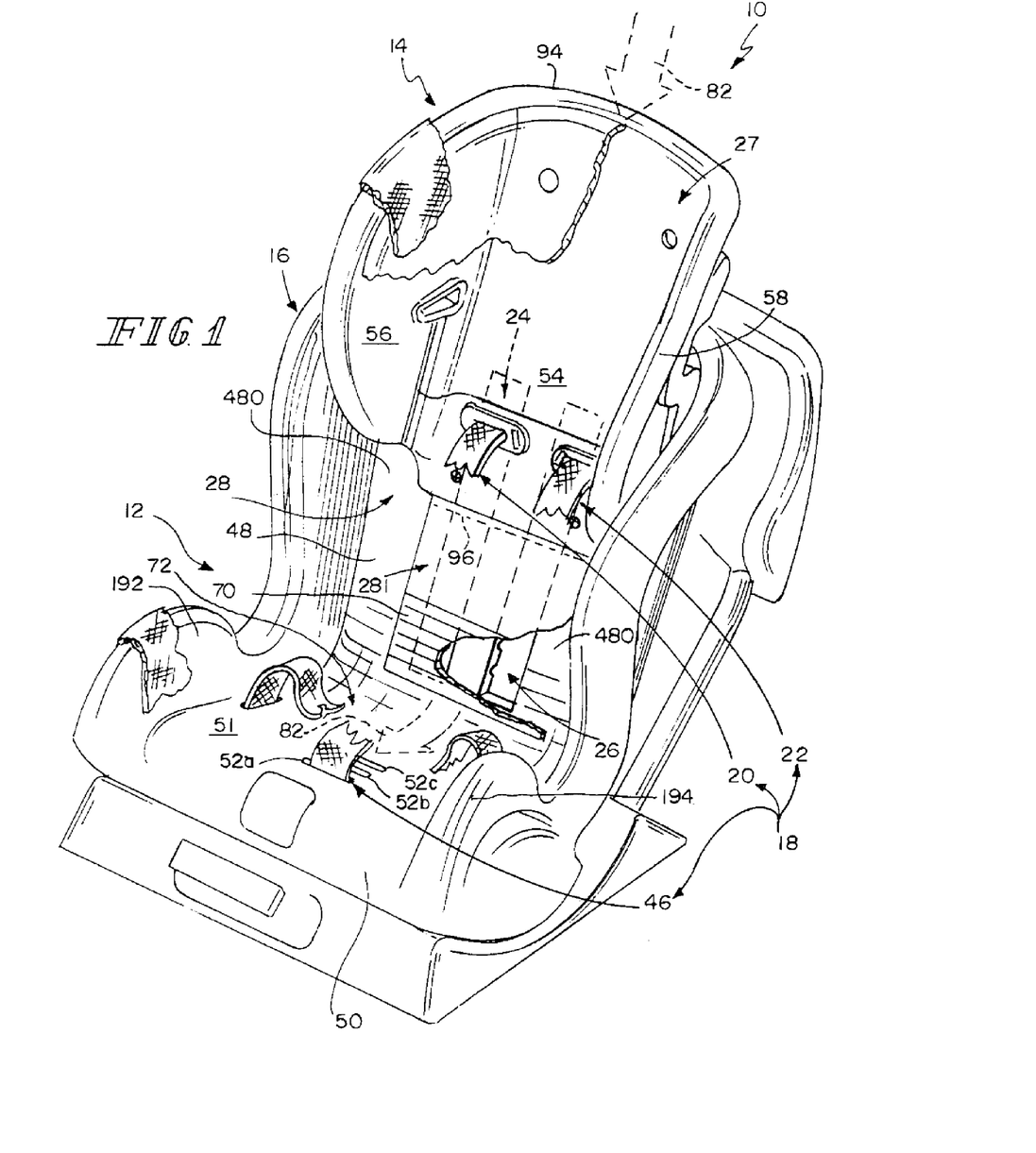

Head cradle 27 is formed to include a top edge 94 positioned to lie in spaced-apart relation to seat base 50 a first distance and a bottom edge 96 positioned to lie in spaced-apart relation to seat base 50 a relatively smaller second distance as suggested in FIGS. 1 and 2a. Head cradle 27 includes a harness-control panel 54 and a plate mount 30. Harness-control panel 54 is positioned to lie in spaced-apart relation to bottom edge 96 of head cradle 27 and includes top edge 94 as suggested in FIG. 2a. Plate mount 30 is appended to harness-control panel 54 and includes bottom edge 96 as suggested in FIG. 2a.

Head cradle 27 further includes a left-side wing 56 and a right-side wing 58 as shown in FIG. 2a. Harness-control panel 54 is arranged to lie between and interconnect left-side and right-side wings 56, 58. Left-side wing 56 and right-side wing 58 are arranged to extend outwardly away from seat back 48 as suggested in FIG. 1. Illustratively, a head of a child is positioned to lie between left-side wing 56 and right-side wing 58 and be supported by harness-control panel 54.

Harness-control panel 54, as shown in FIG. 2a, is formed to include a first shoulder-belt receiving slot 60 and a second shoulder-belt receiving slot 62. First shoulder-belt receiving slot 60 is positioned to lie in laterally spaced-apart relation to second shoulder-belt receiving slot 62. Both shoulder-belt receiving slots 60, 62 are aligned with their companion belt-travel channels 24, 26 formed in seat back 48 as suggested in FIG. 2a. Shoulder-belt receiving slots 60, 62 operate to keep shoulder belts 20, 22 positioned at an appropriate height that corresponds to the vertical position of headrest 14 relative to seat back 48 as suggested in FIGS. 1 and 3.

As shown in FIG. 2a, seat shell 16 includes seat back 48 and seat base 50. Seat back 48 is formed to include first and second belt-travel channels 24, 26. First belt-travel channel 24 extends along a portion of the length of seat back 48 as suggested in FIG. 2a and is positioned to lie in spaced-apart relation to second belt-travel channel 26. Belt-travel channels 24, 26 allow shoulder belts 20, 22 to pass from the rear of seat back 48 to the front of seat back 48.

Seat base 50 is formed to include a plurality of crotch-belt slots 52a, 52b, 52c configured to receive crotch belt 46 as shown in FIGS. 1 and 3. Crotch-belt slots 52a, 52b, 52c are located between a pair of thigh bolsters 192, 194 included in seat base 50. Illustratively, crotch belt 46 is arranged to extend up through crotch-belt slot 52a when headrest 14 is in the raised position as shown in FIG. 1. Alternatively, crotch belt 46 is arranged to extend up through crotch-belt slot 52c when headrest 14 is in the lowered position as shown in FIGS. 3-9.

Channel cover 28 deforms to conform to contoured shape 72 of seat shell 16 to maintain coverage of belt-travel channels 24, 26 at any vertical position of headrest 14. Channel cover 28 includes a plate mount 30 coupled to harness-control panel 54, a pliable plate 32, and a plate retainer 34 as suggested in FIG. 2a.

Pliable plate 32, as shown in FIGS. 2a and 2b, includes a mounting bracket 68 and a channel barrier 69. Channel barrier 69 is appended to the bottom of mounting bracket 68 and extends in downward direction 82. Channel barrier 69 includes a horizontally extending rigid band 67 and a plurality of hinged bands 70. Illustratively, mounting bracket 68 has a narrow width 108 and rigid band 67 has a relatively wider wide width 110 as shown in FIGS. 2a and 2b. Mounting bracket 68 is formed to have narrow width 108 to accommodate plate-retainer fasteners 112 used to couple plate retainer 34 to harness-control panel 54 without interfering with the movement of movable pliable plate 32 relative to head cradle 27.

As shown in FIGS. 2a and 2b, channel barrier 69 includes plurality of hinged bands 70 coupled to rigid band 67. Rigid band 67 has a length 116 as suggested in FIG. 2a and is arranged to interconnect plurality of hinged bands 70 to mounting bracket 68 and support plurality of hinged bands 70. Hinged bands 70 extend horizontally and adjacent bands 70 are coupled to one another by means of a hinge 71 to support companion pairs of bands 70 for pivoting movement relative to each other. Illustratively, each horizontally extending band 70 is configured to have a relatively thin length 114 as shown in FIG. 2a.

Horizontally extending bands 70 are coupled to on one another to deform to conform substantially to a contoured shape of concave surface 72 of seat shell 16 as suggested in FIG. 3. As shown in FIG. 1, horizontally extending bands 70 lie in a generally vertical plane with rigid band 67 and mounting bracket 68 when headrest 14 is in the raised position. As shown in FIG. 3, horizontal bands 70 have pivoted relative to one another to assume contoured shape defined by concave surface 72 in response to headrest 14 having been moved to the lowered position as shown in FIGS. 3 and 9.

Headrest 14 moves over a relatively wide range of motion when moving between the raised position and the lowered position. Movable pliable plate 32 aids in covering belt-travel channels 24, 26 in response to pliable plate 32 assuming a substantially planar shape when headrest 14 is moved to assume the raised position and deforming to assume a contoured shape defined by concave surface 72 of seat shell 16 as headrest 14 moves toward the lowered position. An obstruction, illustratively crotch belt 46, included in juvenile vehicle seat 12 blocks movable pliable plate 32 from moving as a unit with head cradle 27 throughout the movement of headrest 14 from raised position to lowered position. Lost-motion means 44 permits headrest 14 to move downwardly when movable pliable plate 32 is stationary as shown in FIGS. 6-9.

Figures 6, 7:
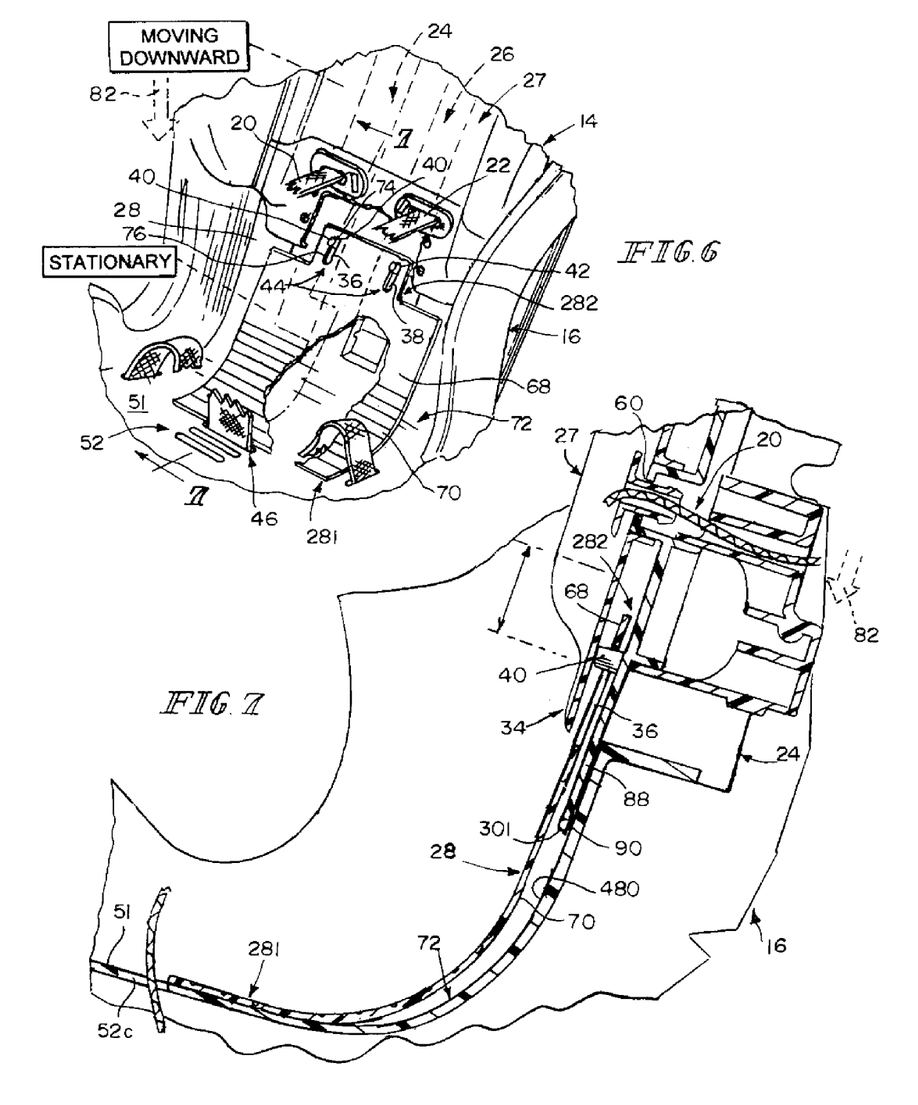
FIG. 6 is a view similar to FIG. 4 showing that the head cradle and the channel cover have moved downwardly as a unit together to a point where a bottom portion of the movable pliable plate has run into a crotch belt extending through a slot in the seat base to cause the movable pliable plate to stop moving relative to the seat base.
FIG. 7 is an enlarged sectional view taken along line 7-7 of FIG. 6.
Figure 8:
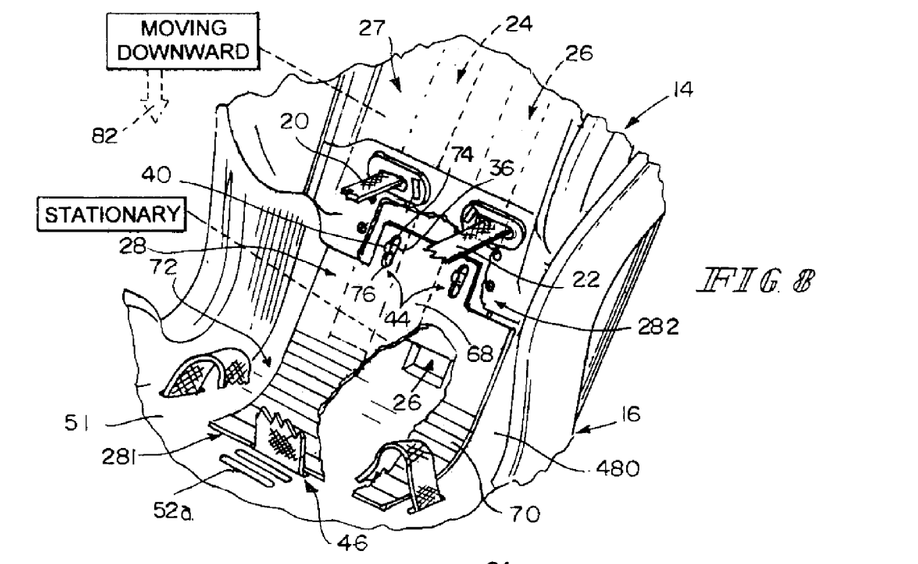
FIG. 8 is a view similar to FIGS. 4 and 6 showing the downward movement of the head cradle has continued while the movable pliable plate of the channel cover has remained in a stationary position covering lower portions of the belt-travel channels and showing that the pair of tabs included in the lost-motion means have moved about midway between an upper stop and a lower stop that both cooperate to define the slot formed in the movable pliable plate.
Figure 9:
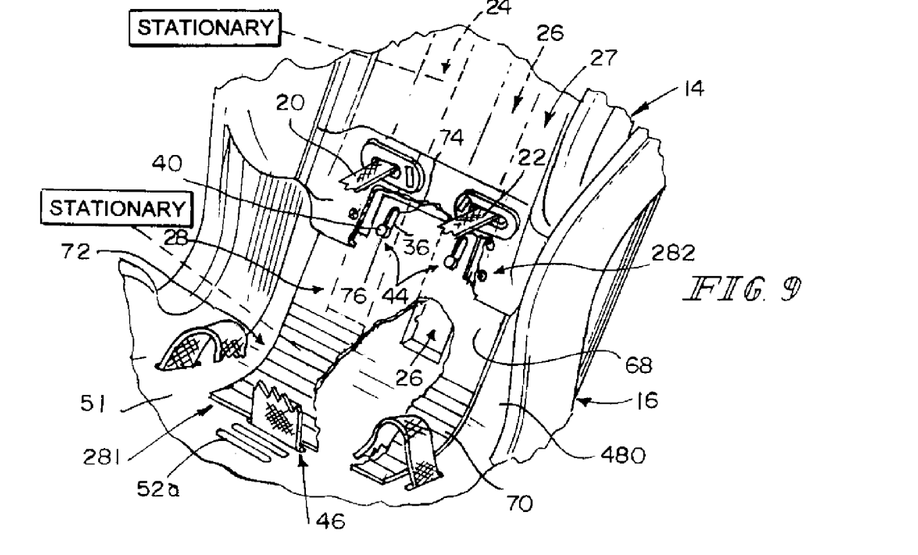
FIG. 9 is a view similar to FIGS. 4, 6, and 8 showing that the headrest has moved downwardly to achieve the lowered position illustrated in FIG. 3 and showing that the tabs have moved into mating contact with the lower stops of their companion slots to cause the head cradle to stop moving downwardly relative to the seat base.

As shown in FIGS. 4-9, lost-motion means 44 permits headrest 14 to move in a downward direction 82 even after channel cover 28 stops moving in response to engagement of pliable plate 32 with crotch belt 46 extending through crotch-belt slot 52. As shown FIG. 4, both head cradle 27 14 and channel cover 28 are able to move in downward direction 82. After continued downward movement of headrest 14, movable pliable plate 32 of channel cover 28 contacts crotch belt 46 and becomes stationary relative to seat base 50 as shown in FIG. 6. As shown in FIG. 8, head cradle 27 continues to move in downward direction 82 as a result of first and second connector tabs 40, 42 of lost-motion means 44 extending into their companion tab-receiving slots 36, 38 also included in lost-motion means 44. As illustrated in FIG. 8, first connector tab 40 has moved midway between upper stop 74 and lower stop 76 associated with first tab-receiving slot 36. As illustrated in FIG. 9, headrest 14 assumes lowered position when first and second connector tabs 40, 42 have moved into mating contact with lower stop 76 of their companion tab-receiving slots 36, 38 causing headrest 14 to stop moving relative to seat base 50.

Child-restraint harness 18 is used to restrain a child sitting on seat shell 16 and configured to include shoulder belts 20, 22, a crotch belt 46, and thigh belts 64, 66 as shown in FIGS. 1, 3, 4, 6, 8, and 9. Belt-travel channels 24, 26 allow shoulder belts 20, 22 to move with headrest 14 along the length of seat back 48 between the raised position and the lowered position. Shoulder belts 20, 22 pass through a series of apertures formed in seat back 48, harness-control panel 54, and plate retainer 34 to arrange shoulder belts 20, 22 properly on the child sitting in seat shell 16.

Shoulder belts 20, 22 also pass through companion belt apertures 84, 86 formed in plate retainer 34 as shown in FIG. 2a. Belt apertures 84, 86 cooperate with shoulder belt-receiving slots 60, 62 formed in harness-control panel 54 to control the positioning of shoulder belts 20, 22 relative to seat base 50. Shoulder belt-receiving slots 60, 62 formed in harness-control panel 54 are arranged to align with companion belt-travel channels 24, 26 formed in seat back 48 as suggested in FIG. 2a. Belt apertures 84, 86 are arranged to align with shoulder belt-receiving slots 60, 62 as suggested in FIG. 5.

Figures 4, 5:
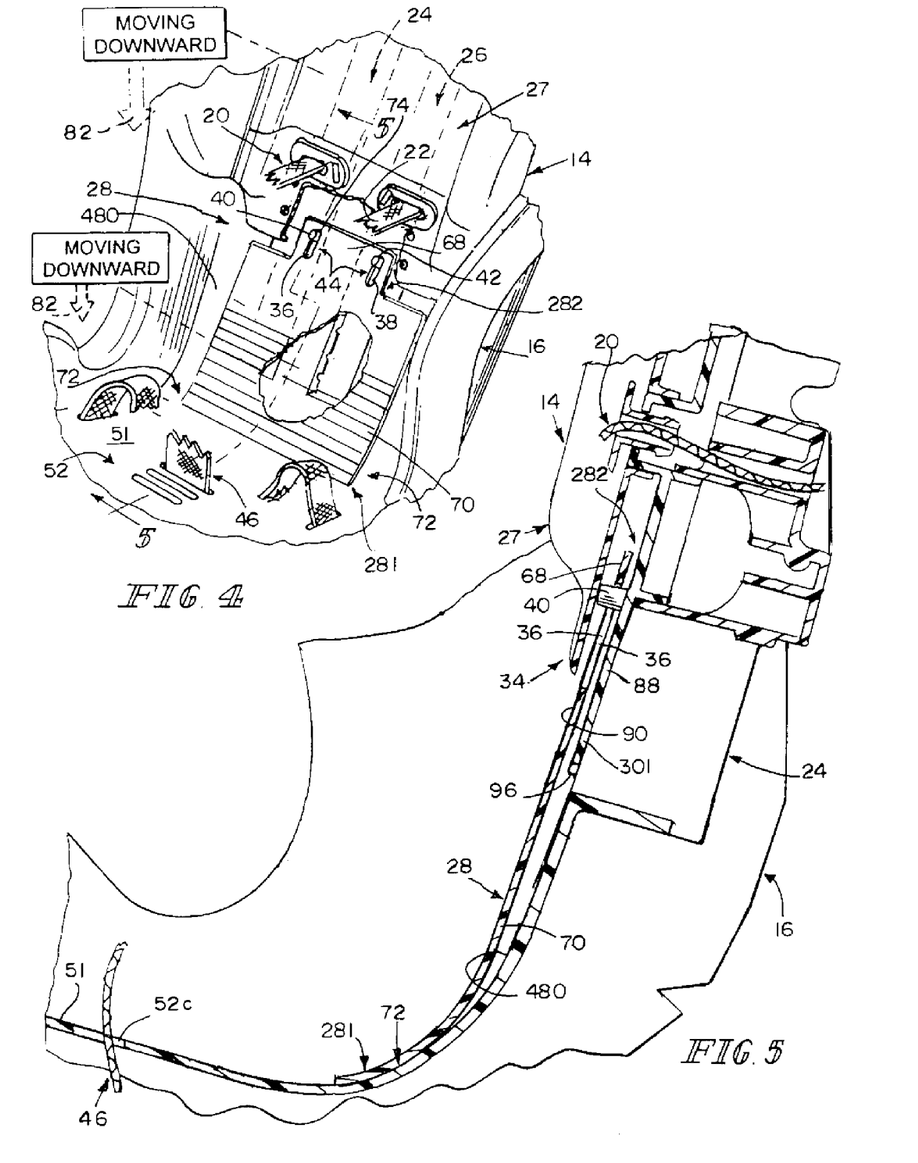
FIG. 4 is an enlarged partial perspective view of a juvenile seat showing the head cradle and the channel cover moving downwardly together as a unit so that the belt-travel channels remain covered.
FIG. 5 is an enlarged sectional view taken along line 5-5 of FIG. 4 showing that a tab appended to a lower portion of the head cradle cooperates with a slot formed in the top of the movable pliable plate to establish lost-motion means for interconnecting the head cradle and the movable pliable plate to allow the head cradle to continue to move downwardly while the pliable plate remains stationary as suggested in FIGS. 8 and 9.

As suggested in FIGS. 2a and 2b, channel cover 28 further includes a plate retainer 34. Plate retainer 34 is coupled to plate mount 30 and is arranged to trap movable pliable plate 32 therebetween as shown in FIGS. 5 and 7. Plate mount 30 is appended to the bottom edge of harness-control panel 54 and arranged to extend in downward direction 82 as shown in FIG. 2a. Connector tabs 40, 42 are positioned to lie in spaced-apart relation to one another and are appended to a front surface 90 of plate mount 30. Connector tabs 40, 42 extend away from plate mount 30 and away from seat back 48 a distance sufficient to contact plate retainer 34 as suggested in FIGS. 5 and 7.

Seat back 48 of seat shell 16 is configured to support the back of a child sitting on seat shell 16 and to support headrest 14 mounted on seat back 48 for movement between the raised position and the lowered position. Seat back 48 is further formed to include belt-travel channels 24, 26 arranged along the length of seat back 48 so that first and second shoulder belts 20, 22 may pass from the rear of seat shell 16 through seat shell 16 and through headrest 14 to secure the child sitting on the seat shell. Belt-travel channels 24, 26 are configured to allow companion shoulder belts 20, 22 to move with headrest 14 along its full range of up-and-down motion on seat back 48.

As shown in FIG. 2a, seat back 48 includes a first upper edge 97, a first lower edge 99, a first left edge 101, and a first right edge 103, all of which cooperate to form first belt-travel channel 24. First upper edge 97 is positioned to lie in spaced-apart relation to seat base 50. First lower edge 99 is positioned to lie between first upper edge 97 and seat base 50 and is positioned to lie parallel to first upper edge 97. First upper and lower edges 97, 99 cooperate to define first belt-travel channel 24 therebetween. First left edge 101 is arranged to intersect first upper and lower edges at 90 degree angles. First right edge 103 is positioned to lie in spaced-apart relation to first left edge to further define first belt-travel channel 24 therebetween.

As shown in FIG. 2a, seat back 48 further includes a second upper edge 98, a second lower edge 100, a second left edge 102, and a second right edge 104, all of which cooperate to define second belt-travel channel 26 therebetween. Second upper edge 98 is positioned to lie in spaced-apart relation to seat base 50. Second lower edge 100 is positioned to lie between second upper edge 98 and seat base 50 and is positioned to parallel to second upper edge 98. First upper edge 97 and second upper edge 98 are arranged to lie in substantially collinear relation to each other. First lower edge 99 and second lower edge 100 are arranged to lie in substantially collinear relation to each other. Second left edge 102 is positioned to lie in spaced-apart relation to first left edge 101 such that first right edge 103 is positioned to lie therebetween. Second right edge 104 is positioned to lie in spaced-apart relation to first right edge 103 such that second left edge 102 is positioned to lie therebetween. Second upper, lower, left, and right edges 98, 100, 102, and 104 cooperate to define second belt-travel channel 26 therebetween.

First left edge 101 is positioned to lie in spaced-apart relation to first right edge 103 to define a channel width 106 of first belt-travel slot 24 as suggested in FIG. 2a. Second left edge 102 is positioned to lie in spaced-apart relation to second right edge 104 to define a channel width 107 of second belt travel slot 26 as suggested in FIG. 2a. Channel cover 28 is included in headrest 14 to cover belt-travel channels 24, 26 formed in seat back 48 of seat shell 16. Belt-travel channels 24, 26 are formed to allow shoulder belts 20, 22 to move with headrest 14 between lowered position (FIG. 1) and raised position (FIG. 3). Pliable plate 32 is included in channel cover 28 to cause headrest 14 to move over an increased travel range to assume the raised position and the lowered position. It is within the scope of the present disclosure that horizontal bands 70 may be a pliable monolithic sheet. The pliable monolithic sheet is made of a plastics material, but may be made of any other suitable material.

Illustratively, lost-motion means 44 is included in channel cover 28 to cause the distance from the top of headrest 14 to the bottom of channel cover 28 to vary as a result of the position of headrest 14 and crotch belt 46. The varying length allows an increased range of motion of headrest 14 without impeding overall function of child restraint 10.

Child restraint 10 includes a juvenile vehicle seat 12 and a headrest 14 as suggested in FIG. 1. Headrest 14 is mounted for up-and-down movement on juvenile vehicle seat 12 as suggested in FIGS. 4-9.

Juvenile vehicle seat 12 includes a seat base 50, a seat back 48 arranged to extend upwardly from seat base 50 and formed to include a first belt-travel channel 24, and a child-restraint harness 18 coupled to juvenile vehicle seat 12 as suggested in FIGS. 1 and 2a. Child-restraint harness 18 is configured to restrain a child sitting on seat base 50. Child-restraint harness 18 includes a first shoulder belt 20 arranged to pass through first belt-travel channel 24 formed in seat back 48 as suggested in FIGS. 1, 4, and 5.

Headrest 14 is mounted on seat back 48 for up-and-down movement relative to seat base 50 between a raised position shown in FIG. 1 and a lowered position shown in FIG. 3. Headrest 14 includes a head cradle 27 coupled to first shoulder belt 20 to move first shoulder belt 20 relative to seat base 50 and seat back 48 during movement of headrest 14 away from seat base 50 to assume the raised position and toward seat base 50 to assume the lowered position as suggested in FIGS. 4-9. Headrest 14 further includes a channel cover 28 coupled to head cradle 27 to move therewith relative to seat base 50 and seat back 48 and arranged to cover first belt-travel channel 24 during movement of headrest 14 between the raised and lowered positions as suggested in FIGS. 1 and 3.

Seat base 50 includes an upwardly facing seat bottom 51 arranged to underlie and support a child seated in juvenile vehicle seat 12. Channel cover 28 includes a lower portion 281 arranged to lie in spaced-apart relation to head cradle 27 and an upper portion 282 arranged to lie between lower portion 281 and head cradle 27. Each of the lower and upper portions 281, 282 of channel cover 28 is arranged to lie in an elevated position above upwardly facing seat bottom 51 covering portions of first belt-travel channel 24 upon movement of headrest 14 to assume the raised position as suggested in FIG. 1. Lower portion 281 of channel cover 28 lies in mating engagement with upwardly facing seat bottom 51 and upper portion 282 of channel cover 28 lies in mating engagement with seat back 48 to cover a portion of first belt-travel channel 24 upon movement of headrest 14 to assume the lowered position as suggested in FIGS. 3 and 9.

Channel cover 28 includes a movable pliable plate 32 providing the upper and lower portions 281, 282. Pliable plate 32 is configured to bend and conform substantially to a forward-facing surface 480 of seat back 48 and upwardly facing seat bottom 51 as pliable plate 32 slides on the forward-facing surface and upwardly facing seat bottom 51 during up-and-down movement of headrest 14 between the raised and lowered positions as suggested in FIGS. 4-9. Channel cover 28 is coupled to head cradle 27 to move therewith relative to seat back 48 and arranged to cover portions of first and second belt-travel channels 24, 26 located between headrest cradle 27 and seat base 50 regardless of the position of headrest 14 on seat back 48.

Pliable plate 32 has a substantially flat shape when headrest 14 is moved to assume the raised position as suggested in FIG. 1. Pliable plate 32 has a non-flat bent shape when headrest 14 is moved to assume the lowered position as suggested in FIGS. 3 and 9.

Lower portion 281 of movable pliable plate 32 comprises a plurality of horizontally extending bands 70 and a hinge 71 associated with each pair of adjacent horizontally extending bands 70. Each hinge 71 is configured to support the adjacent horizontally extending bands 70 for pivotable movement about a horizontally extending pivot axis relative to one another during up-and-down movement of headrest 14 between the raised and lowered positions to cause lower portion 281 to conform substantially to the forward-facing surface 480 of seat back 48 and to upwardly facing seat bottom 51.

Upwardly facing seat bottom 51 of seat base 50 is formed to include a crotch-belt slot (e.g., 52a-c). A crotch belt 46 included in child-restraint harness 18 is arranged to extend upwardly through, for example, crotch-belt slot 52c. Crotch belt 46 is configured to provide means for contacting lower portion 281 of channel cover 28 during movement of headrest 14 from the raised position toward the lowered position as suggested in FIGS. 4-7 to cause movement of channel cover 28 to stop and to establish a stationary position of channel cover 28 when lower portion 281 of channel cover 28 lies in mating engagement with upwardly facing seat bottom 51.

Channel cover 28 further includes lost-motion means 44 interconnecting headrest 14 and upper portion 281 of movable pliable plate 32 for permitting downward movement of headrest 14 toward the lowered position and relative to seat back 48 and to upper and lower portions 282, 281 after channel cover 20 has engaged crotch belt 246 and reached the stationary position as suggested in FIGS. 2a, 4, 6, 8, and 9. Lost-motion means 44 is shown illustratively in FIG. 2a and is configured to mount movable pliable plate 32 on head cradle 27 for movement together as a unit toward the lowered position of headrest 14 until movable pliable plate 32 contacts a portion of crotch belt 46 extending upwardly out of a crotch-belt slot 52a-c formed in seat base 50 and stops moving relative to seat base 50 while allowing head cradle 27 to continue to move toward seat base 50 until headrest 14 achieves the lowered position as suggested in FIGS. 4-9.

Lost-motion means 44 is defined by a first tab-receiving slot 36 formed in channel cover 28 and a first connector tab 40 included in headrest 14 as suggested in FIGS. 2a and 4. First connector tab 40 is arranged to extend into first tab-receiving slot 36 and move up and down in first tab-receiving slot 36 during up-and-down movement of headrest 14 between the raised and lowered positions. A second connector tab 42 is arranged to extend into second tab-receiving slot 38 and move up and down in second tab-receiving slot 38 during up-and-down movement of headrest 14 between the raised and lowered positions as also suggested in FIGS. 2a and 4.

Head cradle 27 includes a left-side wing 56 arranged to extend away from seat back 48, a right-side wing 58 arranged to extend away from seat back 48, and a harness-control panel 54 as suggested in FIGS. 1 and 2a. Harness-control panel 54 is located between and arranged to interconnect left-side and right-side wings 56, 58 and slide along seat back 48 during up-and-down movement of headrest 14 relative to seat back 48.

Harness-control panel 54 is formed to include a first shoulder belt-receiving slot 60 receiving a portion of the first shoulder belt 20 therein and lying in alignment and communication with first belt-travel channel 24 during up-and-down movement of headrest 14 between the raised and lowered positions as suggested in FIGS. 1 and 2a. First shoulder belt-receiving slot 60 is located to provide means for keeping the portion of first shoulder belt 24 at a selected height above upwardly facing seat bottom 51 that corresponds to a vertical position of headrest 14 relative to seat back 48 and upwardly facing seat bottom 51 as suggested in FIGS. 4-9.

Channel cover 28 includes a plate mount 30 coupled to harness-control panel 54 to move therewith as suggested in FIG. 2a. Plate mount 30 is arranged to lie between harness-control panel 54 and upwardly facing seat bottom 51 and a pliable plate 32 depending from plate mount 30 and covering first belt-travel channel 24 during movement of headrest 14 between the raised and lowered positions and lying in mating engagement with upwardly facing seat bottom 51 when headrest 14 is moved to assume the lowered position.

Plate mount 30 includes a support panel 301 coupled to harness-control panel 54 and a first connector tab 40 coupled to support panel 301 and arranged to extend away from seat back 48 as suggested in FIG. 2a. Support panel 301 is arranged to lie between pliable plate 32 and seat back 48 as suggested in FIG. 5. Pliable plate 32 is formed to include a first tab-receiving slot 36 receiving the first connector tab 40 therein to link pliable plate 32 to plate mount 30 as also suggested in FIG. 5.

Pliable plate 32 of channel cover 28 is formed to include an upper stop 74 and a lower stop 76 arranged to lie between upper stop 74 and upwardly facing seat bottom 51 as suggested in FIGS. 2a and 4. Lower stop 76 is also arranged to lie in spaced-apart relation to upper stop 74 to define first tab-receiving slot 36 therebetween as suggested in FIG. 2a. First tab-receiving slot 36 is also arranged to cause first connector tab 40 to contact upper stop 74 in response to movement of headrest 14 to assume the raised position as suggested in FIGS. 1 and 4 and to cause first connector tab 40 to contact lower stop 76 in response to movement of pliable plate 32 to assume a stationary position relative to upwardly facing seat bottom 51 upon engagement with a crotch belt 46 included in child-restraint harness 18 and movement of headrest 14 to assume the lowered position as suggested in FIGS. 3 and 9.

First tab-receiving slot 36 is formed in movable pliable plate 32 as suggested in FIG. 2a. First connector tab 40 is appended to head cradle 27 and arranged to extend into tab-receiving slot 36. First tab-receiving slot 36 is located between an upper stop 74 formed in movable pliable plate 32 and a lower stop 76 formed in movable pliable plate 32 and located between upper stop 74 and seat base 50. First connector tab 40 is arranged to lie in mating contact with upper stop 74 when headrest 14 is in the raised position as suggested in FIG. 4. First connector tab 40 remains in mating contact with upper stop 74 during movement of headrest 14 toward the lowered position until movable pliable plate 32 contacts crotch belt 46 and assumes a stopped position relative to seat base 50 allowing first connector tab 40 to move downwardly in first tab-receiving slot 36 and into mating contact with lower stop 76 when headrest 14 achieves the lowered position.

Seat base 50 and seat back 48 cooperate to form a concave outer surface 72 engaging and supporting channel cover 28 during up-and-down movement of headrest 14 relative to seat back 50 between the raised and lowered positions as suggested in FIGS. 4-9. Channel cover 28 includes a movable pliable plate 32 configured to deform and change shape to conform to the shape of the concave outer surface formed by seat base 50 and seat back 48 during up-and-down movement of headrest 14 relative to seat back 48 between the raised and lowered positions.

Lost-motion means 44 is configured to mount movable pliable plate 32 on head cradle 27 so that headrest 14 is free to move downwardly toward seat base 50 to assume the lowered position even after movable pliable plate 32 stops moving and assumes a stationary position on the concave outer surface after movable pliable plate 32 runs into an obstruction included in juvenile vehicle seat 12. First connector tab 40 appended to a lower portion of head cradle 27 cooperates with a first tab-receiving slot 36 formed in an upper portion 282 of movable pliable plate 32 to establish lost-motion means 44.

The invention claimed is:

1. A child restraint comprising
a juvenile vehicle seat including a seat base, a seat back arranged to extend upwardly from the seat base and formed to include a first belt-travel channel, and a child-restraint harness coupled to the juvenile vehicle seat and configured to restrain a child sitting on the seat base, the child-restraint harness including a first shoulder belt arranged to pass through the first belt-travel channel formed in the seat back, and
a headrest mounted on the seat back for up-and-down movement relative to the seat base between raised and lowered positions, the headrest including a head cradle coupled to the first shoulder belt to move the first shoulder belt relative to the seat base and seat back during movement of the headrest away from the seat base to assume the raised position and toward the seat base to assume the lowered position, the headrest further including a channel cover coupled to the head cradle to move therewith relative to the seat base and seat back and arranged to cover the first belt-travel channel during movement of the headrest between the raised and lowered positions,
wherein the channel cover further includes a movable pliable plate slidably supported on the seat back to move along the seat back to cover the first belt-travel channel and lost-motion means interconnecting the head cradle and the movable pliable plate for permitting downward movement of the head cradle toward the seat base and relative to the seat back and to the movable pliable plate after the movable pliable plate has run into an obstruction and stopped moving relative to the seat base.

2. The child restraint of claim 1, wherein the seat base includes an upwardly facing seat bottom arranged to underlie and support a child seated in the juvenile vehicle seat, the movable pliable plate includes a lower portion arranged to lie in spaced-apart relation to the head cradle and an upper portion arranged to lie between the lower portion and the head cradle, each of the lower and upper portions of the movable pliable plate is arranged to lie in an elevated position above the seat bottom and to cover portions of the first belt-travel channel upon movement of the headrest to assume the raised position, and the lower portion of the movable pliable plate lies in mating engagement with the upwardly facing seat bottom and the upper portion of the movable pliable plate lies in mating engagement with the seat back to cover a portion of the first belt-travel channel upon movement of the headrest to assume the lowered position.

3. The child restraint of claim 2, wherein the upper and lower portions of the movable pliable plate are configured to bend and conform substantially to a forward-facing surface of the seat back and the upwardly facing seat bottom as the movable pliable plate slides on the forward-facing surface and the upwardly facing seat bottom during up-and-down movement of the headrest between the raised and lowered positions and wherein the lost-motion means further includes a first connector tab appended to the head cradle and arranged to extend into a tab-receiving slot formed in the upper portion of the movable pliable plate and move in the tab-receiving slot relative to the movable pliable plate during movement of the head cradle relative to the seat base.

4. The child restraint of claim 3, wherein the lower portion of the movable pliable plate comprises a plurality of horizontally extending bands and a hinge associated with each pair of adjacent horizontally extending bands is configured to support the adjacent horizontally extending bands for pivotable movement about a horizontally extending pivot axis relative to one another during up-and-down movement of the headrest between the raised and lowered positions to cause the lower portion to conform substantially to the forward-facing surface of the seat back and to the upwardly facing seat bottom.

5. A child restraint comprising
a juvenile vehicle seat including a seat base, a seat back arranged to extend upwardly from the seat base and formed to include a first belt-travel channel, and a child-restraint harness coupled to the juvenile vehicle seat and configured to restrain a child sitting on the seat base, the child-restraint harness including a first shoulder belt arranged to pass through the first belt-travel channel formed in the seat back, and
a headrest mounted on the seat back for up-and-down movement relative to the seat base between raised and lowered positions, the headrest including a head cradle coupled to the first shoulder belt to move the first shoulder belt relative to the seat base and seat back during movement of the headrest away from the seat base to assume the raised position and toward the seat base to assume the lowered position, the headrest further including a channel cover coupled to the head cradle to move therewith relative to the seat base and seat back and arranged to cover the first belt-travel channel during movement of the headrest between the raised and lowered positions,
wherein the seat base includes an upwardly facing seat bottom arranged to underlie and support a child seated in the juvenile vehicle seat, the channel cover includes a lower portion arranged to lie in spaced-apart relation to the head cradle and an upper portion arranged to lie between the lower portion and the head cradle, each of the lower and upper portions of the channel cover is arranged to lie in an elevated position above the seat bottom, each of the lower and upper portions of the channel cover and cover portions of the first belt-travel channel upon movement of the headrest to assume the raised position, and the lower portion of the channel cover lies in mating engagement with the upwardly facing seat bottom and the upper portion of the channel cover lies in mating engagement with the seat back to cover a portion of the first belt-travel channel upon movement of the headrest to assume the lowered position, and
wherein the upwardly facing seat bottom is formed to include a crotch-belt slot, a crotch belt included in the child-restraint harness extends upwardly through the crotch-belt slot and contacts the lower portion of the channel cover during movement of the headrest from the raised position toward the lowered position to cause movement of the channel cover to stop and to establish a stationary position of the channel cover when the lower portion of the channel cover lies in mating engagement with the upwardly facing seat bottom.

6. A child restraint comprising
a juvenile vehicle seat including a seat base, a seat back arranged to extend upwardly from the seat base and formed to include a first belt-travel channel, and a child-restraint harness coupled to the juvenile vehicle seat and configured to restrain a child sitting on the seat base, the child-restraint harness including a first shoulder belt arranged to pass through the first belt-travel channel formed in the seat back, and
a headrest mounted on the seat back for up-and-down movement relative to the seat base between raised and lowered positions, the headrest including a head cradle coupled to the first shoulder belt to move the first shoulder belt relative to the seat base and seat back during movement of the headrest away from the seat base to assume the raised position and toward the seat base to assume the lowered position, the headrest further including a channel cover coupled to the head cradle to move therewith relative to the seat base and seat back and arranged to cover the first belt-travel channel during movement of the headrest between the raised and lowered positions,
wherein the seat base includes an upwardly facing seat bottom arranged to underlie and support a child seated in the juvenile vehicle seat, the channel cover includes a lower portion arranged to lie in spaced-apart relation to the head cradle and an upper portion arranged to lie between the lower portion and the head cradle, each of the lower and upper portions of the channel cover is arranged to lie in an elevated position above the seat bottom and cover portions of the first belt-travel channel upon movement of the headrest to assume the raised position, and the lower portion of the channel cover lies in mating engagement with the upwardly facing seat bottom and the upper portion of the channel cover lies in mating engagement with the seat back to cover a portion of the first belt-travel channel upon movement of the headrest to assume the lowered position,
wherein the upwardly facing seat bottom is formed to include a crotch-belt slot, a crotch belt included in the child-restraint harness is arranged to extend upwardly through the crotch-belt slot and configured to provide means for contacting the lower portion of the channel cover during movement of the headrest from the raised position toward the lowered position to cause movement of the channel cover to stop and to establish a stationary position of the channel cover when the lower portion of the channel cover lies in mating engagement with the upwardly facing seat bottom, and
wherein the channel cover further includes lost-motion means interconnecting the head cradle and the upper portion for permitting downward movement of the head cradle toward the lowered position and relative to the seat back and to the upper and lower portions after the channel cover has engaged the crotch belt and reached the stationary position.

7. The child restraint of claim 6, wherein the lost-motion means is defined by a first tab-receiving slot formed in the channel cover and a first connector tab included in the headrest and arranged to extend into the first tab-receiving slot and move up and down in the first tab-receiving slot during up-and-down movement of the headrest between the raised and lowered positions.

8. The child restraint of claim 1, wherein the head cradle includes a left-side wing arranged to extend away from the seat back, a right-side wing arranged to extend away from the seat back, and a harness-control panel located between and arranged to interconnect the left-side and right-side wings and slide along the seat back during up-and-down movement of the headrest relative to the seat back, the harness-control panel is formed to include a first shoulder belt-receiving slot receiving a portion of the first shoulder belt therein and lying in alignment and communication with the first belt-travel channel during up-and-down movement of the headrest between the raised and lowered positions, the first shoulder belt-receiving slot is located to provide means for keeping the portion of the first shoulder belt at a selected height above the upwardly facing seat bottom that corresponds to a vertical position of the headrest relative to the seat back and the upwardly facing seat bottom, and the channel cover further includes a plate mount coupled to the harness-control panel to move therewith and arranged to lie between the harness-control panel and the upwardly facing seat bottom, the pliable plate depends from the plate mount and covering covers the first belt-travel channel during movement of the headrest between the raised and lowered positions and lying lays in mating engagement with the upwardly facing seat bottom when the headrest is moved to assume the lowered position.

9. The child restraint of claim 8, wherein the pliable plate has a substantially flat shape when the headrest is moved to assume the raised position and the pliable plate has a non-flat bent shape when the headrest is moved to assume the lowered position.

10. A child restraint comprising
a juvenile vehicle seat including a seat base, a seat back arranged to extend upwardly from the seat base and formed to include a first belt-travel channel, and a child-restraint harness coupled to the juvenile vehicle seat and configured to restrain a child sitting on the seat base, the child-restraint harness including a first shoulder belt arranged to pass through the first belt-travel channel formed in the seat back, and
a headrest mounted on the seat back for up-and-down movement relative to the seat base between raised and lowered positions, the headrest including a head cradle coupled to the first shoulder belt to move the first shoulder belt relative to the seat base and seat back during movement of the headrest away from the seat base to assume the raised position and toward the seat base to assume the lowered position, the headrest further including a channel cover coupled to the head cradle to move therewith relative to the seat base and seat back and arranged to cover the first belt-travel channel during movement of the headrest between the raised and lowered positions,
wherein the head cradle includes a left-side wing arranged to extend away from the seat back, a right-side wing arranged to extend away from the seat back, and a harness-control panel located between and arranged to interconnect the left-side and right-side wings and slide along the seat back during up-and-down movement of the headrest relative to the seat back, the harness-control panel is formed to include a first shoulder belt-receiving slot receiving a portion of the first shoulder belt therein and lying in alignment and communication with the first belt-travel channel during up-and-down movement of the headrest between the raised and lowered positions, the first shoulder belt-receiving slot is located to provide means for keeping the portion of the first shoulder belt at a selected height above the upwardly facing seat bottom that corresponds to a vertical position of the headrest relative to the seat back and the upwardly facing seat bottom, and the channel cover includes a plate mount coupled to the harness-control panel to move therewith and arranged to lie between the harness-control panel and the upwardly facing seat bottom and a pliable plate depending from the plate mount and covering the first belt-travel channel during movement of the headrest between the raised and lowered positions and lying in mating engagement with the upwardly facing seat bottom when the headrest is moved to assume the lowered position, and
wherein the plate mount includes a support panel coupled to the harness-control panel and a first connector tab coupled to the support panel and arranged to extend away from the seat back, the support panel is arranged to lie between the pliable plate and the seat back, and the pliable plate is formed to include a first tab-receiving slot receiving the first connector tab therein to link the pliable plate to the plate mount.

11. The child restraint of claim 10, wherein the pliable plate is formed to include an upper stop and a lower stop arranged to lie between the upper stop and the upwardly facing seat bottom and in spaced-apart relation to the upper stop to define the first tab-receiving slot therebetween and to cause the first connector tab to contact the upper stop in response to movement of the headrest to assume the raised position and to cause the first connector tab to contact the lower stop in response to movement of the pliable plate to assume a stationary position relative to the upwardly facing seat bottom upon engagement with a crotch belt included in the child-restraint harness and arranged to extend upwardly out of a crotch-belt slot formed in the upwardly facing seat bottom and movement of the headrest to assume the lowered position.

12. A child restraint comprising
a juvenile vehicle seat including a seat shell having a seat base and a seat back arranged to extend upwardly from the seat base and formed to include first and second belt-travel channels and a child-restraint harness arranged to cooperate with the seat shell to restrain a child sitting on the seat shell, the child-restraint harness including first and second shoulder belts and a crotch belt, each of the first and second shoulder belts being arranged to pass through a companion one of the first and second belt-travel channels formed in the seat back, and
a headrest mounted for movement on the seat back relative to the seat base between raised and lowered positions, the first and second belt-travel channels being arranged to allow the first and second shoulder belts to move along a length of the seat back as the headrest moves between the raised and lowered positions relative to the seat back, the headrest including a head cradle coupled to the first and second shoulder belts and a channel cover coupled to the head cradle to move therewith relative to the seat back and arranged to cover portions of the first and second belt-travel channels located between the head cradle and the seat base regardless of the position of the headrest on the seat back,
wherein the channel cover includes a movable pliable plate and lost-motion means for mounting the movable pliable plate on the head cradle for movement together as a unit toward the lowered position of the headrest until the movable pliable plate contacts a portion of the crotch belt extending upwardly out of a crotch-belt slot formed in the seat base and stops moving relative to the seat base while allowing the head cradle to continue to move toward the seat base until the headrest achieves the lowered position.

13. The child restraint of claim 12, wherein the lost-motion means includes a first tab-receiving slot formed in the movable pliable plate and a first connector tab appended to the head cradle and arranged to extend into the tab-receiving slot, the first tab-receiving slot is located between an upper stop formed in the movable pliable plate and a lower stop formed in the movable pliable plate and located between the upper stop and the seat base, the first connector tab is arranged to lie in mating contact with the upper stop when the headrest is in the raised position, the first connector tab remains in mating contact with the upper stop during movement of the headrest toward the lowered position until the movable pliable plate contacts the crotch belt and assumes a stopped position relative to the seat base allowing the first connector tab to move downwardly in the first tab-receiving slot and into mating contact with the lower stop when the headrest achieves the lowered position.

14. A child restraint comprising
a juvenile vehicle seat including a child-restraint harness and a seat shell having a seat back formed to include first and second belt-travel channels, and
a headrest mounted for up-and-down movement on the seat back, the headrest including a head cradle and a channel cover coupled to the head cradle to move therewith, the child-restraint harness including a first shoulder belt passing through a first shoulder belt-receiving slot formed in the head cradle and the first belt-travel channel formed in the seat back and a second shoulder belt passing through a second shoulder belt-receiving slot formed in the head cradle and the second belt-travel channel formed in the seat back, the channel cover being coupled to move up and down with the head cradle relative to the seat back during movement of the headrest between a raised position and a lowered position to cause the first and second belt-travel channels always to remain covered by the headrest regardless of the vertical position of the headrest on the seat back,
wherein the channel cover includes a movable pliable plate and lost-motion means for mounting the movable pliable plate on the head cradle the movable pliable plate and the lost-motion means slidably supported on the seat back for movement together as a unit toward the lowered position of the headrest until the movable pliable plate contacts an obstruction coupled to the seat shell and stops moving relative to the seat base while allowing the head cradle to continue to move toward the seat base until the headrest achieves the lowered position.

15. The child restraint of claim 14, wherein the seat shell further includes a seat base, the seat back is arranged to extend upwardly from the seat base, the seat base and seat back cooperate to form a concave outer surface engaging and supporting the channel cover during up-and-down movement of the headrest relative to the seat back between the raised and lowered positions, and the movable pliable plate is configured to deform and change shape to conform to the shape of the concave outer surface formed by the seat base and seat back during up-and-down movement of the headrest relative to the seat back between the raised and lowered positions.

16. The child restraint of claim 14, wherein a first connector tab appended to a lower portion of the head cradle cooperates with a first tab-receiving slot formed in an upper portion of the movable pliable plate to establish the lost-motion means.

17. The child restraint of claim 14, wherein the seat base includes an upwardly facing seat bottom arranged to underlie and support a child seated in the juvenile vehicle seat, the movable pliable plate includes a lower portion arranged to lie in spaced-apart relation to the head cradle and an upper portion arranged to lie between the lower portion and the head cradle, each of the lower and upper portions of the movable pliable plate is arranged to lie in an elevated position above the seat bottom covering portions of the first belt-travel channel upon movement of the headrest to assume the raised position, and the lower portion of the movable pliable plate lies in mating engagement with the upwardly facing seat bottom and the upper portion of the movable pliable plate lies in mating engagement with the seat back to cover a portion of the first belt-travel channel upon movement of the headrest to assume the lowered position.

18. The child restraint of claim 14, wherein the lower portion comprises a plurality of horizontally extending bands and a hinge associated with each pair of adjacent horizontally extending bands and configured to support the adjacent horizontally extending bands for pivotable movement about a horizontally extending pivot axis relative to one another during up-and-down movement of the headrest between the raised and lowered positions to cause the lower portion to conform substantially to the seat shell.

* * * * *